United States Patent
Snopko et al.

(10) Patent No.: US 11,146,073 B2
(45) Date of Patent: Oct. 12, 2021

(54) SYSTEM AND METHOD FOR OPTIMIZATION OF ENGINES ON A COMMON VARIABLE FREQUENCY BUS

(71) Applicant: Caterpillar Inc., Peoria, IL (US)

(72) Inventors: Mike Snopko, Washington, IL (US); Perry Converse, Lafayette, IN (US); David Miller, Peoria, IL (US); Alexander Smith, Round Rock, TX (US)

(73) Assignee: Caterpillar Inc., Peoria, IL (US)

( * ) Notice: Subject to any disclaimer, the term of this patent is extended or adjusted under 35 U.S.C. 154(b) by 62 days.

(21) Appl. No.: 16/672,235

(22) Filed: Nov. 1, 2019

(65) Prior Publication Data
US 2021/0135458 A1  May 6, 2021

(51) Int. Cl.
| | |
|---|---|
| *H02J 1/10* | (2006.01) |
| *H02J 3/38* | (2006.01) |
| *H02J 3/40* | (2006.01) |
| *H02J 3/46* | (2006.01) |
| *B63B 79/40* | (2020.01) |
| *B63H 21/14* | (2006.01) |
| *F02D 25/02* | (2006.01) |
| *F02D 41/26* | (2006.01) |
| *B63H 1/02* | (2006.01) |

(52) U.S. Cl.
CPC .............. *H02J 3/40* (2013.01); *B63B 79/40* (2020.01); *B63H 1/02* (2013.01); *B63H 21/14* (2013.01); *F02D 25/02* (2013.01); *F02D 41/26* (2013.01); *H02J 3/46* (2013.01); *H02J 2310/42* (2020.01)

(58) Field of Classification Search
CPC . H02J 3/40; H02J 3/46; H02J 2310/42; B63B 79/40; B63H 21/14; B63H 1/02; B63H 25/42; B63H 21/17; F02D 41/26; F02D 25/02; F02D 29/06; F02D 41/1406; F02D 2200/0625; F02D 41/021
USPC .......................................................... 307/52
See application file for complete search history.

(56) References Cited

U.S. PATENT DOCUMENTS

| | | |
|---|---|---|
| 8,362,638 B2 | 1/2013 | Gemin et al. |
| 8,716,896 B2 | 5/2014 | Algrain |
| 8,766,479 B2 | 7/2014 | Dorn et al. |
| 8,841,787 B1 | 9/2014 | Folken et al. |

(Continued)

FOREIGN PATENT DOCUMENTS

WO  WO 2005/02038 A1  1/2005

*Primary Examiner* — Richard Tan
(74) *Attorney, Agent, or Firm* — von Briesen & Roper, s.c.

(57) ABSTRACT

A system and method for synchronizing a frequency of plurality of variable frequency generators with a variable frequency load over a variable frequency bus independent of a frequency conversion stage. A synchronization controller is configured to determine an optimal bus frequency of the variable frequency bus based on at least one power demand requirement of the variable frequency load operatively connected to the variable frequency bus. With the optimal frequency, an available power range supplied by the plurality of variable frequency gensets at the optimal bus frequency can be determined. The synchronization controller then asymmetrically loads the variable frequency load to the plurality variable frequency gensets at the optimal bus frequency based on the operating range of each variable frequency genset and recursively updates the optimal bus frequency based on operational statistics of the asymmetrically loaded variable frequency gensets.

20 Claims, 3 Drawing Sheets

(56) References Cited

U.S. PATENT DOCUMENTS

| | | |
|---|---|---|
| 9,172,250 B2 | 10/2015 | Moore et al. |
| 9,628,010 B2 | 4/2017 | Clarke et al. |
| 2010/0094490 A1 | 4/2010 | Alston et al. |
| 2017/0012439 A1 | 1/2017 | Zhang et al. |
| 2017/0012440 A1 | 1/2017 | Converse |
| 2017/0353037 A1 | 12/2017 | Reddy |

SYSTEM AND METHOD FOR OPTIMIZATION OF ENGINES ON A COMMON VARIABLE FREQUENCY BUS

TECHNICAL FIELD

This disclosure relates generally to a system and method for operating multiple generator sets on a variable frequency bus.

BACKGROUND

Off-grid power generation, as in marine vessels for instance, is achieved by coupling multiple generator sets (gensets) to drive both primary loads, such as propellers or other drive mechanisms, as well as various auxiliary loads, such as climate control systems, lighting systems, pumps, and the like. Different genset configurations are selected according to factors such as load optimization, load distribution, fuel economy, reliability, costs of implementation and maintenance, and the like. A genset includes in combination a prime mover and an electrical generator. The prime mover may be a mechanical engine such as an internal combustion engine (e.g., a diesel compression ignition engine) or gas turbine in which a hydrocarbon-based fuel and air is combusted to release the chemical energy therein and to convert that energy into a motive force. The motive force, in turn, is used to rotate a rotor relative to a stator of the generator so that a rotating magnetic field induces an electrical current in the field windings of the stator. The generated electricity is used to service the primary and auxiliary load demands.

The frequency and voltage of the gensets must be synchronized with the electrical load on the common bus. This is achieved by converting the genset output to a constant frequency, constant voltage output that is compatible with that of the common bus. While some equipment may operate directly at the constant frequency and constant voltage of the common bus, some equipment, such as variable frequency equipment, may not be compatible. Incompatible equipment, such as variable frequency gensets or variable frequency loads, may require an additional conversion stage to convert the constant frequency and the constant voltage of the common bus to a specific frequency and specific voltage desired by the variable frequency equipment.

Each conversion stage typically suffers from a 2%-8% overall efficiency loss of the genset output. The conversion stages may also employ complex control systems and protective measures in order to reliably maintain the frequency and/or voltage conversion which in turn also contributes to the overall efficiency loss. In addition to increasing the operation cost of the variable frequency equipment, the complex controls often have an adverse impact on the cycle time of the variable frequency equipment.

The present disclosure is directed at addressing one or more of the deficiencies and disadvantages set forth above. However, it should be appreciated that the solution of any particular problem is not a limitation on the scope of this disclosure or of the attached claims except to the extent expressly noted.

SUMMARY OF THE DISCLOSURE

In one example of the present disclosure, a variable frequency bus system for providing power to a variable frequency bus is described. The variable frequency bus system may include a variable frequency bus and a plurality of variable frequency generator sets (gensets) for providing electrical power to the variable frequency bus. A synchronization controller is in electrical communication with the variable frequency bus and the plurality of variable frequency gensets. The synchronization controller is configured to determine an optimal bus frequency of the variable frequency bus. A variable frequency load may be operatively connected to the variable frequency bus. The synchronization controller may determine the optimal bus frequency based on power demand requirements of the variable frequency load. The synchronization controller is further configured to determine an available power range supplied by the plurality of variable frequency gensets at the optimal bus frequency. Based on the operating range of each variable frequency genset, the synchronization controller may asymmetrically load the variable frequency load to the plurality of variable frequency gensets at the optimal bus frequency In another example, the present disclosure describes a marine vessel. The marine vessel may include a hull and at least one variable frequency thruster mounted to the hull to provide propulsion. The at least one variable frequency thruster generates a variable frequency load on a variable frequency bus. A plurality of gensets may be operatively connected to the variable frequency bus to supply power to the variable frequency load. Each genset of the plurality of variable frequency gensets may have a prime mover rotationally coupled to an electrical generator to supply electrical power to the variable frequency load via the variable frequency bus. A synchronization controller may be in electrical communication with the variable frequency bus and the plurality of variable frequency gensets. The synchronization controller may further be configured to determine an optimal bus frequency of the variable frequency bus based the variable frequency load. Additionally, the synchronization controller may be configured to determine an available power range supplied by the plurality of variable frequency gensets at the optimal bus frequency. The synchronization controller may asymmetrically load the variable frequency load to the plurality of variable frequency gensets at the optimal bus frequency. The asymmetric loading is based on the operating range of each variable frequency genset to supply electrical power to the variable frequency load.

In another example, the present disclosure describes a method for synchronizing the frequency of a plurality of variable frequency gensets to the frequency of a variable frequency load via a variable frequency bus. The method includes determining an optimal bus frequency of the variable frequency bus based on at least one variable frequency load operatively connected to the variable frequency bus. An available power range supplied by the plurality of variable speed gensets is determined at the optimal bus frequency. The at least one variable frequency load is then asymmetrically loaded to the plurality of variable speed gensets at the optimal bus frequency based on the operating range of each variable frequency genset.

DETAILED DESCRIPTION

This disclosure relates to an electrical power system which includes a plurality of variable frequency generator sets (VFGs) configured to generate and supply power to a variable frequency load (VFL) via a variable frequency bus (VFB). The disclosure also relates to the control strategies and electronic controllers for regulating the operation of the VFGs. In particular, the disclosure relates to a VFB system for determining an optimal frequency for the VFB and determining an asymmetric load sharing scheme for servicing the VFL among the VFGs at the optimal frequency.

Figure 1:
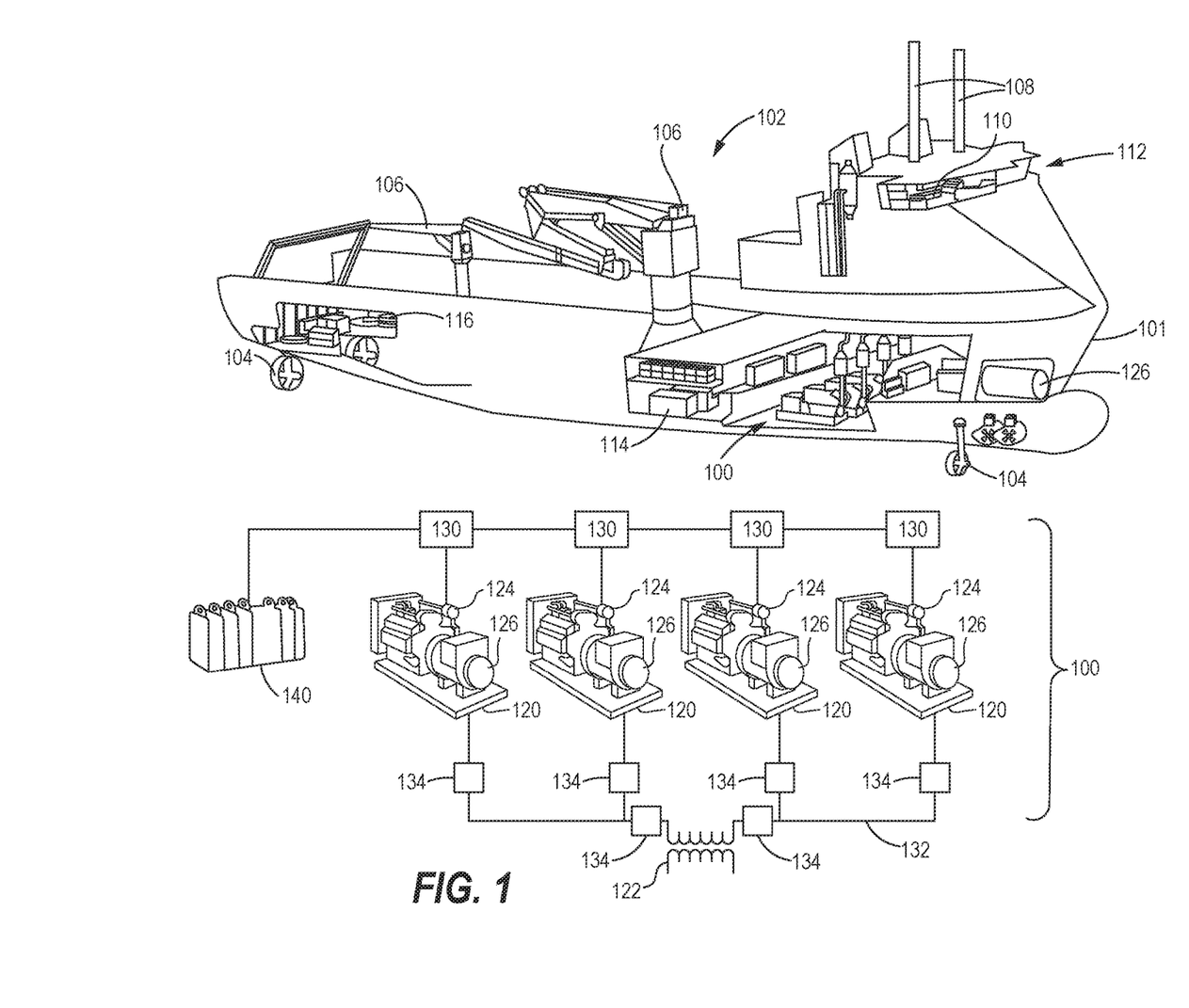
FIG. 1 is an illustration of a marine vessel side elevation view of with a variable frequency bus system in accordance with an illustrative embodiment.
Figure 2:
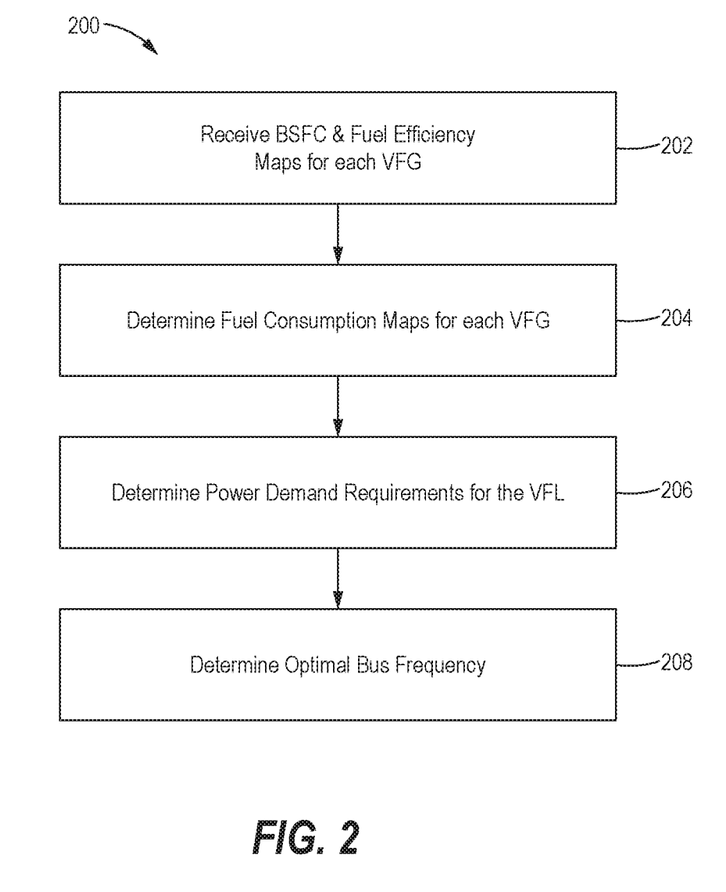
FIG. 2 is a flow chart of a method for an optimal bus frequency control strategy.

Now referring to the drawings, wherein like reference numbers refer to like elements, illustrated in FIG. 1 is a VFB system 100 that may be arranged to generate electric power for an isolated electrical load. For example, as shown in FIG. 2, the VFB system 100 may be arranged to provide the electrical requirements of a marine vessel 102 like a freighter or cargo ship. The marine vessel 102 in FIG. 1 is one example of a system with variable frequency power requirements; however, the teachings of this disclosure can be employed with ease and efficacy on any other machine with variable frequency power requirements. The electrical power system 100 may generate electrical power for the propulsion units 104 mounted on the hull 101 of the marine vessel 102. In one embodiment of the disclosure, the propulsion unit 104 may be a plurality of azimuth thrusters which are electrically driven units that can independently rotate with respect to the hull of the marine vessel 102, eliminating the need for a rudder. The azimuth thrusters may be powered by electricity generated directly by the VFB system 100 rather than being directly driven by a power unit such as an engine, reactor, or boiler. In addition to the propulsion units 104, the electrical requirements of the marine vessel 102 may include motorized cranes 106 for lifting and moving freight, communication equipment 108 for communicating with shore and other marine vessels, and the like. Furthermore, the VFB system 100 may supply electrical power to navigation controls 110 disposed in the bridge 112 that direct movement of the marine vessel, heating ventilation and air condition unit (HVAC) 114 that provides environmental control for the marine vessel, or living quarter and food preparation unit 116 that addresses the needs of the marine vessel passengers. These components together may make up the electrical load of the marine vessel.

The marine vessel 102 is electrically isolated from a larger power grid; therefore, the independent VFB system 100 is configured to supply power for the electrical power required by the various components of the marine vessel 102. The term independent may refer to an "off-grid" electrical power system 100 such as isolated systems on an island, drilling platform, remote location, and the like. Other marine applications for the VFB system 100, in addition to the freighter illustrated in FIG. 1 may include military vessels, passenger liners, tankers, aircrafts, and the like. Likewise, VFB system 100 described herein may be utilized for any other application where electrical power from a utility-supplied power grid is not readily available or may be interrupted. For example VFB system 100 may be used for oil procuring applications, gas procuring applications, temporary military bases, and the like. Advantageously, VFB system 100 described herein can operate without a larger electrical grid where electrical power is supplied by external sources, such as power plants, nuclear reactors, hydro-electric dams, solar generation, wind generation, and the like.

To generate electrical power, the VFB system 100 includes a plurality of VFGs 120 which operate in parallel to service the power demand of the VFL 122. Each genset 120 includes a prime mover 124 rotationally coupled to an electrical generator 126. The prime mover may be an internal combustion engine, in particular, a diesel compression ignition engine; while the electrical generator 126 may be a single phase generator or, in particular, a multi-phase alternator. The prime mover 124 can combust hydrocarbon fuel and air to produce a motive power that rotates a magnetic field in the electrical generator 126. The rotating magnetic field induces a current in stator field windings to convert the motive power to electrical power. To provide fuel for the prime mover 124 to combust, the electrical power system 100 may be operably associated with one or more fuel tanks 128 or reservoirs. In addition to the example of an internal combustion engine, other variations of prime movers 124 may include gas combustion turbines, rotary engines, reactors, steam boilers, and the like. While the electrical capacity of the VFGs 120 described herein may be rated at any suitable quantity, an exemplary genset may produce several kilowatts and the combination of a plurality of gensets in parallel may produce several hundred kilowatts. To govern operation of the prime mover 124 and the electrical generators 126, each genset 120 may include an electronic VFG controller 130. The VFG controller 130 may be a computing device capable of performing typical computing and digital processing functions.

The electrical power generated by the electrical generator 126 of the gensets 120 may be in the form of alternating current (AC), where voltage and the flow of electric current periodically reverses direction, in contrast to direct current (DC) flowing in one direction. The phase change of the alternating current may produce current and voltage in accordance with a cycling waveform. In a parallel arrangement, the total current generated by the VFB system 100 is the sum of the individual currents generated by each of the plurality of VFGs 120 while the voltage is generally the same across each of the gensets. The VFB 132 can be electrically connected through a network or circuit with the electrical equipment of the marine vessel 102 considered together to make up the VFL 122 of the vessel. Therefore, each of the plurality of responsible of providing a portion of the VFL 122 of the vessel. The sum total of electrical power supplied by each of the plurality of VFGs 120 make up the power source of the vessel.

The VFB system 100 is a variable frequency system in which all of the components of the system are capable of operating at variable frequencies independent of any frequency conversion stages. Independent of any frequency conversion stages refers to arrangements in which the VFGs 120 and the VFL 122 are directly connected to the VFB 132. More specifically, an electrical output 134 of the electrical generator 126 and an electrical input 136 of the VFL 122 are directly connected to the VFB 132 without an intervening frequency conversion stage, such as a variable frequency drive (VFD). On a common bus arrangement, each VFG is paired with a VFD which converts the variable frequency output to a constant frequency, constant voltage output which is more suitable for the common bus which operates on a constant frequency, and constant voltage. Similarly, a VFL may be connected to the common bus via a VFD as well.

A VFD is an AC to AC converter which is configured to first convert an AC signal to a DC voltage and then converts the DC voltage into a synthetic sine wave based on the constant frequency and constant voltage of the common bus. A VFD is specifically chosen for each genset based on the rated output (i.e. the "nameplate" output) and is specifically programmed for unique controls and protections for that specific genset. In marine application, where many gensets may be used in parallel, a VFD may be deployed at specific loads to convert the constant frequency, constant voltage of the common bus back to a variable frequency output to power, for example, a variable frequency thruster motor, variable speed pumps, or other variable speed loads. By operatively connecting the output 134 of the electrical generator 126 directly to the VFB 132 and operatively connecting the input 136 of the VFL 122 directly to the VFB 132 as well, the VFB system 100 can eliminate the need for an intervening frequency conversion stage, e.g. a VFD, and recuperate the 2-8% efficiency loss typically imparted by the frequency conversion stage.

Physical components of the VFL 122 may include reactive elements, such as capacitive or inductive elements. The reactive elements may cause a phase shift between the current and voltage shift out of phase with one another thus imparting a reactive impedance on the VFB. Because the VFGs 120 are connected in parallel, their electrical output including the real and reactive components should be synchronized to minimize the impedance of the reactive component. To coordinate the synchronization of the plurality of VFGs 120, a synchronization controller 140 may be designated. The synchronization controller 140 may communicate with each of the individual VFG controllers 130 to direct operation of the individual VFGs 120. The electronic controllers 130, 140 may include a processor, an application specific integrated circuit (ASIC), other appropriate circuitry for performing digital functions, and may have associated data storage capabilities. The electronic controllers 130, 140 may be discrete, individual units, or their functions may be distributed over a plurality of distinct components. Thus, the VFG controllers 130 and the synchronization controller 140 may be implemented on the same computing equipment rather than as two distinct units as shown in FIG. 1. The electronic controllers 130, 140 may operate and communicate with each other via various means such as digital signals, analog signals, or through any other suitable means. The electronic controllers may communicate with each other via wired connections or via wireless connections through radio frequency or Wi-Fi mediums.

One method for synchronizing the plurality of VFGs 120 is symmetric load sharing in which each genset output constitutes a proportional share of the total electrical demand by the load. If the VFGs 120 are equally rated, then each VFG 120 will share an equal portion of the electrical load, for example if the given system has four VFGs 120, then each VGF may provide 25% of the total electrical load.

However, if the VFGs 120 are not equally rated, then the symmetrical load sharing strategy determines an equal proportional share of its rated electrical capacity and is subjected to the same level of stress and wear. For example, if the four VFGs 120 are rated for 100 kW, 100 kW, 50 kW, and 50 Kw, and the VFL 122 is 100 kW, then the synchronization controller 140 would direct the VFGs 120 to produce 33.3 kW, 33.3 kW, 16.6 kW, and 16.6 kW, respectively. Thus, in symmetric load sharing schemes, each engine is operated to output power according to the relative capacity of the given engine in proportion to the total capacity of the combined engines. Hence, the engines are all being operated at the same percentage of their individual, relative capacity, and theoretically should be subjected to the same level of stress and wear, even though some engines may be producing a larger absolute output than other engines.

While symmetrical load sharing accounts evenly for the different electrical capacities of the plurality of VFGs 120 of the VFB system 100, it may not account for differences between the prime movers 124 of the individual gensets. For example, if the prime mover 124 is an internal combustion engine, each prime mover may operate in accordance with an associated brake specific fuel consumption (BFSC) map. The BFSC map determines the fuel efficiency ranges of the prime mover 124 as it burns fuel and produces rotational power based on fuel type, load, and speed. The BFSC map may determine or indicate where the prime mover is operating most efficiently or according to its best fuel economy. The efficiency setpoint of the prime mover 124 may not correspond to the electrical output being requested of a particular VFG 120 according to the symmetrical load sharing strategy. In other words, the portion of the electrical load being allocated to the gensets may cause the prime movers to operate inefficiently.

To account for the efficiency of the prime movers 124, the VFB system 100 may be synchronized according to an asymmetric load sharing strategy in which each genset 120 is not required to supply a proportional share of the electrical load 134. The portion of the electrical load allocated to each genset may be based in part on the fuel efficiency of the prime mover. In addition to fuel efficiency considerations, the asymmetric load sharing method may account for other constraints such as the emissions being produced by the prime mover through the fuel combustion process. To determine the portion of the VFL 122 each of the individual VFGs 120 is to supply, the VFB system 100 can process constraints such as rated capacity, power factors, generator synchronization, and the like. The VFB system 100 may process the aforementioned constraints through the synchronization controller 140 to determine an asymmetric offset value relative to the symmetric proportional loading.

Before the synchronization controller 140 can perform the asymmetric load sharing strategy, the synchronization controller 140 determines an optimal bus frequency for the VFB 132. Referring to FIG. 2, an optimal bus frequency control strategy 200 flow chart is illustrated. The optimal bus frequency is determined based on operational characteristics of the VFGs 120 and power demand requirements of the VFL 122. Operational characteristics of each VFGs 120 may include the BFSC map of the prime mover 124 and a fuel efficiency map of the electrical generator 126. As previously mentioned, the BFSC map determines the fuel efficiency ranges of the prime mover 124, while the fuel efficiency map determines the energy conversion efficiency of the electrical generator 126. At step 202, the synchronization controller 140 may retrieve or receive data regarding the BFSC map and the fuel efficiency maps from memory.

At step 204, the synchronization controller 140 processes the retrieved data to determine a fuel consumption map for each VFG 120 which determines the fuel consumption ranges for each of the corresponding VFGs 120 including an efficiency setpoint. The synchronization controller 140 may compare the BFSCs and fuel efficiency maps to historical data to determine the fuel consumption map. The fuel consumption map may include operational setpoints such as a minimum, maximum, and efficiency setpoints for operating the corresponding VFG 120. The efficient setpoint may be the target output for the corresponding VFG 120 which produces the greatest fuel efficiency, whereas the minimum and maximum setpoints are determined by the rated output of the VFG based on the power demand requirements of the VFL 122.

The synchronization controller 140 may use the fuel consumption map along with the power demand requirements of the VFL 122 to determine the optimal bus frequency. More specifically, the power demand requirements may include at least one of a frequency requirement, a voltage requirement, future load requirement, or a variability of the VFL 122. At step 206, based on the historical data stored in memory, the synchronization controller 140 determines power demand requirements of the VFL 122.

By way of example, an operator can set a travel speed target for the propulsion units 104 to be 10 knots. The power demand requirements for the selected travel speed target to be 3500 kW at 44 Hz and a variability of +/−300 kW which may yield an overall frequency range of 43-45 Hz. The future load may be related to control schemes for the propulsion units 104. Because the power delivered to the thrusters may not be instantaneous but rather follows a non-linear curve to reach the set travel speed. Once the travel speed is achieved the delivered power may decrease slightly to maintain the selected travel speed. For example, the desired load may be 3500 kW but a future load may be an additional 250 kW but delivered over five minutes and then decreased to 3350 kW to maintain a coasting velocity. Once the power demand requirements are determined, the synchronization controller 140 can determine a frequency range map for the VFB 132 based on those power demand requirements. From the frequency range map and the power demand requirements, the synchronization controller 140 can determine an optimal frequency of the VFB 132 within that frequency range.

At step 208, the synchronization controller 140 determines the optimal bus frequency based on at least one power demand requirement of the VFL 122, such as least one of a frequency requirement, a voltage requirement, future load requirement, or a variability. To determine the optimal bus frequency, the synchronization controller 140 employs an optimization model which minimizes a selected constraint and processes the power demand requirements according to the optimization model to determine the optimal bus frequency. The synchronization controller 140 may receive a selected mode constraint from the operator in the bridge 110 which prioritizes considerations related to the selected operating mode. For example, the operator may select one of a fuel efficiency mode, an emission reduction mode, or a performance mode.

Each mode may impart constraints on the optimization model to prioritize the selected consideration when determining the optimal bus frequency. Accordingly, the fuel efficiency mode will prioritize minimizing fuel consumption, the emission reduction mode will prioritize reducing emitted emissions, and the power mode will prioritize torque all while meeting the power demand requirements of the VFL 122. Therefore, the inputs of the optimization model may include, but not limited to, the frequency requirements, voltage requirements, future load requirements, variability, fuel consumption maps, and the selected mode constraint. The output of the optimization model may be the optimal bus frequency within a range of optimal frequencies.

In the illustrated embodiment, the optimization model may include a particle swarm optimization to solve a mixed integer non-linear programming problem; however it should be appreciated that other optimization models for prioritizing the selected mode constraint are also contemplated. It should be appreciated that all the data processed during the optimal bus frequency control strategy 200 are stored in the working memory of the synchronization controller, for example the BFSC maps, fuel efficiency maps, fuel consumption maps, the optimization model, and any related data are all stored in memory for later retrieval or modification. The synchronization controller 140 can then determine an available power range supplied by the plurality of variable frequency gensets 120 at the optimal bus frequency determined at step 208.

Figure 3:
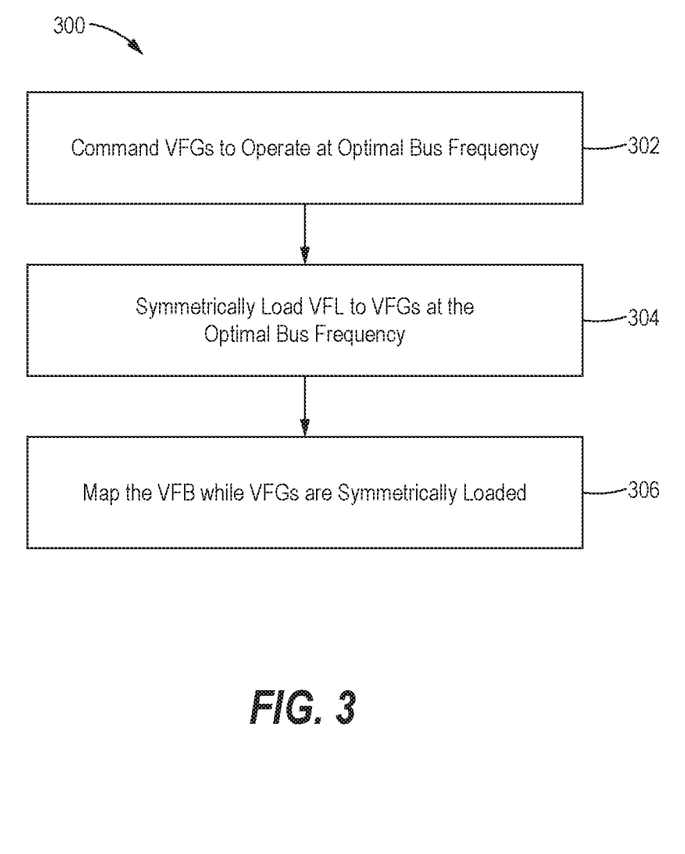
FIG. 3 is a flow chart of a method for an optimal power range control strategy.

With reference FIG. 3, an available power range control strategy 300 flow chart is illustrated. At step 302, after determining the optimal bus frequency, the synchronization controller 140 commands the VFGs 120 to operate at that optimal bus frequency. At step 304, the synchronization controller 140 performs a symmetric loading strategy to load the VFL 122 proportionally across the connected VFGs 120 based on the corresponding fuel consumption map. By symmetrically loading the VFGs 120, the synchronization controller can accurately map the VFB 132, at step 306. In particular, the synchronization controller 140 can determine the optimal operating ranges of each VFG 120 at that optimal bus frequency. By choosing to map the VFB 132 at the optimal bus frequency, the synchronization controller 140 can determine the optimal operational setpoints based on a reduced set of variables thus reducing computational load on the synchronization controller 140 and improving response time.

By way of the example above, the synchronization controller 140 may command the plurality of VFGs 120 to operate at the optimal frequency of 44 Hz and then determines the optimal operating range of each VFG 120 which may include a minimum, maximum, and optimal loading setpoints within that optimal operating range. The synchronization controller 140 can process the optimal operating ranges to determine the available power range supplied by the plurality of VFGs 120 in concert at the optimal bus frequency or frequencies while also accounting for future load and variability of the VFL 122.

With the VFB 132 mapped, the synchronization controller can asymmetrically load the VFGs with the VFL based on the optimal setpoints determined at step 306 to achieve further performance improvements. As previously mentioned, asymmetric loading accounts for performance related variations among the individual prime movers 124. Therefore, it is advantageous to shift from the symmetric load sharing scheme to an asymmetric load sharing scheme after the optimal setpoints are determined to achieve further operating efficiencies such as prioritizing fuel efficiency, emissions reduction, maximizing torque response, or the like.

Figure 4:
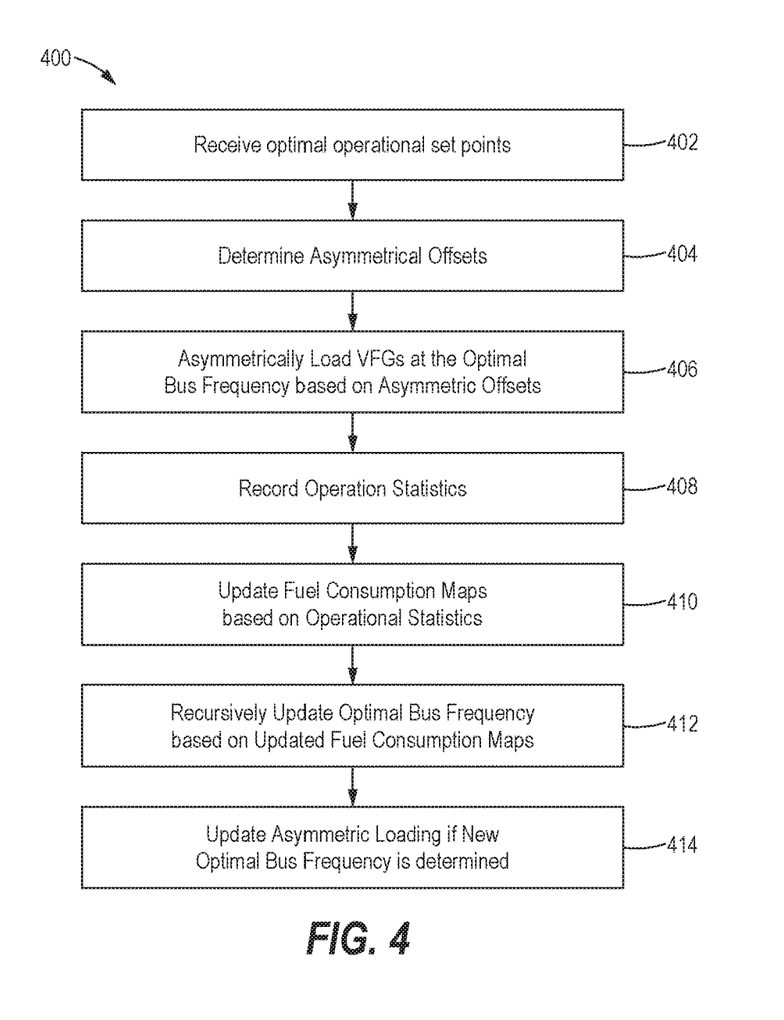
FIG. 4 is a flow chart of a method for an asymmetric loading control strategy.

With reference to FIG. 4, a flow chart for an asymmetric loading control strategy 400 is illustrated. At step 402, the synchronization controller 140 receives the optimal operational setpoints for each VFG 120 based on the optimal operating ranges determined by the available power range control strategy 300. At 404, the synchronization controller can compare the optimal setpoints to the fuel consumption map of the corresponding VFG 120 to determine an asymmetric offset. The asymmetric offset is related to a difference between the optimal setpoints determined at the optimal bus frequency and the efficient setpoints of the prime mover 124 determined based on at least the fuel consumption map. However, the synchronization controller may also process at least one of the BFSC map, fuel efficiency map, or selected mode constraints in addition to the fuel consumption map to determine the asymmetric offset.

At step 406, with the determined asymmetric offsets the synchronization controller 140 can command the VFGs 120 to operate under the asymmetric load sharing strategy based on the asymmetric offset. With the VFGs 120 operating under an asymmetric load sharing scheme, the VFB system 100 is operating at the most efficient load sharing strategy for the VFL 122. However, the VFL 122 is usually not static and can change based on the operation marine vessel 102. The synchronization controller 140 is configured to recursively update the fuel consumption maps based on recorded operational statistics of the asymmetrically loaded VFGs 120 in real time. In this manner, the synchronization controller 140 can recursively determine the optimal bus frequency in response to any changes in the power demand requirements of the VFL 122. At step 408, the synchronization controller 140 may record operational statistics such as fuel consumption, emissions, torque, and the like. The synchronization controller 140 is then configured to update the fuel consumption maps based on the recorded operational statistics, at step 410. It should be appreciated that the operational statistics may also be used to update the BFSC and fuel efficiency maps from which the fuel consumption maps are determined. However, the synchronization controller 140 may also directly update the fuel consumption maps based on the operational statistics.

At step 412, the optimal bus frequency is updated based on the updated fuel consumption maps. More specifically, the optimization model processes the updated fuel consumption maps to determine an updated optimal bus frequency. Therefore, if a new optimal bus frequency is determined, the synchronization controller 140 is configured to update the asymmetric offsets of the VFGs 120 because the optimal operating ranges for each VFG 120 will have changed based on the updated optimal bus frequency, at step 414. In particular, if the updated optimal bus frequency is different than the previously determined optimal bus frequency, the synchronization controller 140 is configured to repeat the optimal power range control strategy 300 to determine new optimal operational setpoints and thus new asymmetric offsets for each VFG 120. In this manner, the VFB system 100 recursively updates the determined fuel consumption maps in response to changes in the VFL 122 to ensure that the VFB system 100, and in turn the VFGs 120, are running at the optimal bus frequency.

INDUSTRIAL APPLICABILITY

In general, the present disclosure finds utility in marine application, but can also find utility in various other applications such as mining, off-shore drilling, construction, farming, transportation, and other industries. In particular, the present disclosure provides cost-efficient, fuel-efficient, and simple solutions for operating multiple variable frequency gensets in parallel to directly supply power to a variable frequency bus without any frequency conversion.

Typically each variable frequency genset is paired with a variable frequency drive (VFD) which converts the variable frequency output to a constant frequency, constant voltage output which is more suitable for a common bus which operates on a constant frequency, and constant voltage.

A VFD is an AC to AC converter which is configured to first convert an AC signal to a DC voltage and then converts the DC voltage into a synthetic sine wave based on the constant frequency and constant voltage of the common bus. A VFD is specially chosen for each genset based on the rated output (i.e. the "nameplate" output) and programmed for specific controls and protections for that specific genset. In marine application, where many gensets may be used in parallel, a VFD may be deployed at specific loads to convert the constant frequency, constant voltage of the common bus back to a variable frequency output to power, for example, a variable frequency thruster motor, variable speed pumps, or other variable speed loads. Each VFD within the system can impart a 2% to 8% loss in efficiency. The present disclosure aims to improve fuel efficiency, reduce system costs, reduce system complexity, and decrease maintenance costs by directly connecting a VFG to a VFB to directly service a VFL independent of any frequency conversion stages.

Figure 5:
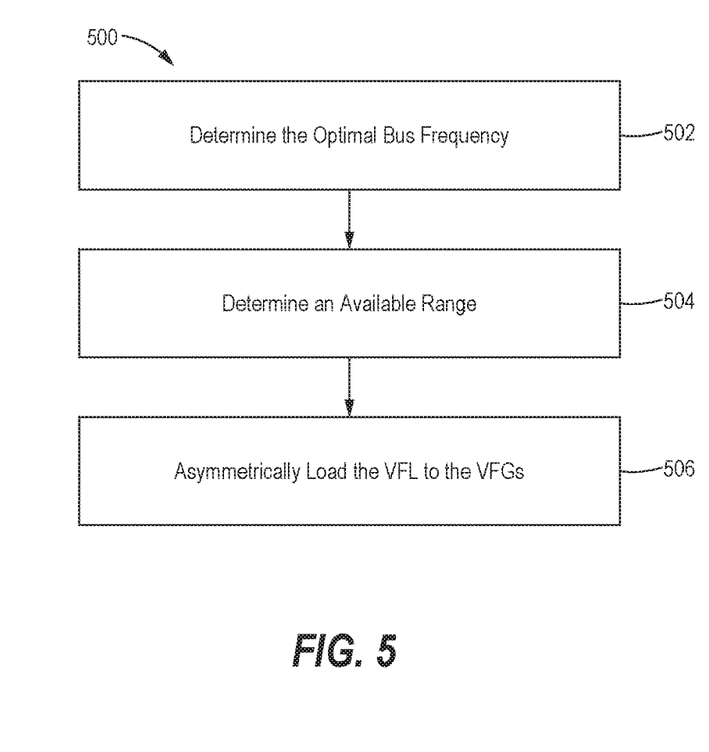
FIG. 5 is a flow chart of a method for synchronizing a variable frequency bus.

With reference to FIG. 5, a flow chart for a VFB synchronization control strategy 500 is illustrated. At step 502, the synchronization controller 140 is configured to determine the optimal bus frequency of the VFB based on at least one of a frequency requirement, a voltage requirement, future load, or a variability of the VFL 122. At step 504, the synchronization controller 140 is configured to determine an available power range supplied by the plurality of VFGs 120 at the optimal bus frequency. And at step 506, the synchronization controller 140 is configured to asymmetrically load the VFL 132 to the plurality VFGs 120 at the optimal bus frequency based on the operating range of each VFG to supply electrical power to the VFL 132.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of the terms "a" and "an" and "the" and "at least one" and similar referents in the context of describing the invention (especially in the context of the following claims) are to be construed to cover both the singular and the plural, unless otherwise indicated herein or clearly contradicted by context. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:
1. A variable frequency bus (VFB) system, comprising:
a VFB;
a plurality of variable frequency gensets (VFGs); and
a synchronization controller in electrical communication with the plurality of variable frequency gensets and the VFB, the synchronization controller configured to:

determine an optimal bus frequency of the VFB based on power demand requirements of a variable frequency load (VFL) operatively connected to the VFB;

determine an available power range supplied by the plurality of variable frequency gensets at the optimal bus frequency; and asymmetrically load the VFL to the plurality of variable frequency gensets at the optimal bus frequency based on an operating range of each VFG.

2. The VFB system of claim 1, wherein each VFG comprises an electrical generator having an electrical output directly connected to the VFB, and the VFL comprises an electrical input directly connected to the VFB.

3. The VFB system of claim 1, wherein the optimal bus frequency is determined based on a fuel consumption map of each VFG and based on the VFL, and the synchronization controller is further configured to:

update the fuel consumption maps based on operational statistics of the asymmetrically loaded VFGs; and recursively update the optimal bus frequency based on the updated fuel consumption maps at the VFL.

4. The VFB system of claim 1, wherein determining the optimal bus frequency further comprises:

receiving a brake specific fuel consumption map of a prime mover and a fuel efficiency map of an alternator for each VFG;

determining a fuel consumption map for each VFG based on the brake specific fuel consumption map and the fuel efficiency map;

determine a frequency requirement and voltage requirement of the power demand requirements; and determining the optimal bus frequency based on the fuel consumption map, frequency requirement, and voltage requirement.

5. The VFB system of claim 4, wherein the optimal bus frequency is determined by comparing at least the fuel consumption map, frequency requirement, and voltage requirement to a an optimization model to determine the optimal bus frequency at a minimized fuel consumption.

6. The VFB system of claim 5, wherein the optimization model is a graphical mixed-integer non-linear optimization problem solved by a particle swarm optimization.

7. The VFB system of claim 4, wherein determining the available power range of the VFGs comprises:

commanding the plurality of variable frequency gensets to operate at the optimal bus frequency;

symmetrically loading the VFL to the plurality of variable frequency gensets based on the corresponding fuel consumption map (determine symmetric setpoints for the VFGs); and mapping an optimal operating range for each VFG at the optimal bus frequency to determine the available power range of the plurality of variable frequency gensets.

8. The VFB system of claim 7, wherein the asymmetrically loading the VFL to the plurality variable frequency gensets further comprises:

receiving a minimum, maximum, and optimal setpoint for each VFG based on the optimal operating range;

determinizing an asymmetric offset for each VFG based on at least the fuel consumption maps and the optimal setpoint; and the asymmetrically loading the VFL to the plurality of variable frequency gensets at the optimal bus frequency based on the corresponding asymmetric offset.

9. A marine vessel, comprising:

a hull;

at least one variable frequency thruster mounted to the hull to provide propulsion, wherein the at least one variable frequency thruster generates a variable frequency load (VFL);

a variable frequency bus (VFB);

a plurality of variable frequency gensets (VFGs) operatively connected to the VFB to supply power to the VFL, each VFG having a prime mover rotationally coupled to an electrical generator to supply electrical power to the VFL via the VFB; and a synchronization controller in electrical communication with the plurality of variable frequency gensets and the VFB, the synchronization controller configured to:

determine an optimal bus frequency of the VFB based on the VFL;

determine an available power range supplied by the plurality of variable frequency gensets at the optimal bus frequency; and asymmetrically load the VFL to the plurality of variable frequency gensets at the optimal bus frequency based on an operating range of each VFG to supply electrical power to the VFL.

10. The marine vessel of claim 9, wherein each VFG comprises the electrical generator having an electrical output directly connected to the VFB, and the VFL comprises an electrical input directly connected to the VFB.

11. The marine vessel of claim 9, wherein the optimal bus frequency is determined based on a fuel consumption map of each VFG and based on the VFL, and the synchronization controller is further configured to:

update the fuel consumption maps based on operational statistics of the asymmetrically loaded VFGs; and recursively update the optimal bus frequency based on the updated fuel consumption maps at the VFL.

12. The marine vessel of claim 9, wherein determining the optimal bus frequency further comprises:

receiving a brake specific fuel consumption map of a prime mover and a fuel efficiency map of an alternator for each VFG;

determining a fuel consumption map for each VFG based on the brake specific fuel consumption map and the fuel efficiency map;

determine a frequency requirement and voltage requirement (and load variability) of a requested power demand of the VFL; and determining the optimal bus frequency based on the fuel consumption map, frequency requirement, and voltage requirement.

13. The marine vessel of claim 12, wherein the determining the available power range of the VFGs comprises:

commanding the plurality of variable frequency gensets to operate at the optimal bus frequency;

symmetrically loading the VFL to the plurality of variable frequency gensets based on the corresponding fuel consumption map (determine symmetric setpoints for the VFGs); and mapping an optimal operating range for each VFG at the optimal bus frequency to determine the available power range of the plurality of variable frequency gensets.

14. The marine vessel of claim 13, wherein the asymmetrically loading the VFL to the plurality of variable frequency gensets further comprises:

receiving a minimum, maximum, and optimal setpoint for each VFG based on the optimal operating range;

determinizing an asymmetric offset for each VFG based on at least the fuel consumption maps and the optimal setpoint; and the asymmetrically loading the VFL to the plurality of variable frequency gensets at the optimal bus frequency based on the corresponding asymmetric offset.

15. A method for synchronizing a frequency of a plurality of variable frequency gensets (VFGs) to at least one variable frequency load (VFL) via a variable frequency bus (VFB), the method comprising:

determining an optimal bus frequency of the VFB based on the at least one VFL operatively connected to the VFB;

determining an available power range supplied by the plurality of variable frequency gensets at the optimal bus frequency; and asymmetrically loading the VFL to the plurality of variable frequency gensets at the optimal bus frequency based on an operating range of each VFG.

16. The method of claim 15, wherein each VFG comprises an electrical generator having an electrical output directly connected to the VFB, and the VFL comprises an electrical input directly connected to the VFB.

17. The method of claim 15, wherein the optimal bus frequency is determined based on a fuel consumption map of each VFG and based on the VFL, and the synchronization controller is further configured to:

update the fuel consumption maps based on operational statistics of the asymmetrically loaded VFGs; and recursively update the optimal bus frequency based on the updated fuel consumption maps at the VFL.

18. The method of claim 15, wherein determining the optimal bus frequency further comprises:

receiving a brake specific fuel consumption map of a prime mover and a fuel efficiency map of an alternator for each VFG;

determining a fuel consumption map for each VFG based on the brake specific fuel consumption map and the fuel efficiency map;

determining a frequency requirement and voltage requirement (and load variability) of a requested power demand of the VFL; and determining the optimal bus frequency based on the fuel consumption map, frequency requirement, and voltage requirement.

19. The method of claim 18, wherein the determining the available power range of the VFGs comprises:

commanding the plurality of variable frequency gensets to operate at the optimal bus frequency;

symmetrically loading the VFL to the plurality of variable frequency gensets based on the corresponding fuel consumption map (determine symmetric setpoints for the VFGs); and mapping an optimal operating range for each VFG at the optimal bus frequency to determine the available power range of the plurality of variable frequency gensets.

20. The method of claim 19, wherein the asymmetrically loading the VFL to the plurality of variable frequency gensets further comprises:

receiving a minimum, maximum, and optimal setpoint for each VFG based on the optimal operating range;

determinizing an asymmetric offset for each VFG based on at least the fuel consumption maps and the optimal setpoint; and the asymmetrically loading the VFL to the plurality of variable frequency gensets at the optimal bus frequency based on the corresponding asymmetric offset.

* * * * *